US009562550B2

(12) United States Patent
Swan et al.

(10) Patent No.: US 9,562,550 B2
(45) Date of Patent: Feb. 7, 2017

(54) ACCESSORY CLIPS

(71) Applicant: S & S Precision, LLC, Virginia Beach, VA (US)

(72) Inventors: Johnny E. Swan, Virginia Beach, VA (US); Andrew C. Borland, Virginia Beach, VA (US); William-Joseph Basan Elizalde, Virginia Beach, VA (US)

(73) Assignee: S & S PRECISION, LLC, Virginia Beach, VA (US)

( * ) Notice: Subject to any disclaimer, the term of this patent is extended or adjusted under 35 U.S.C. 154(b) by 0 days.

(21) Appl. No.: 14/809,870

(22) Filed: Jul. 27, 2015

(65) Prior Publication Data

US 2016/0025120 A1    Jan. 28, 2016

Related U.S. Application Data

(60) Provisional application No. 62/029,166, filed on Jul. 25, 2014.

(51) Int. Cl.
*F16B 2/10* (2006.01)
*F16B 2/18* (2006.01)
*F16M 13/02* (2006.01)
*F41G 11/00* (2006.01)
*F41C 23/16* (2006.01)

(52) U.S. Cl.
CPC . *F16B 2/18* (2013.01); *F16B 2/10* (2013.01); *F16M 13/022* (2013.01); *F41G 11/003* (2013.01); *F41G 11/004* (2013.01); *F41C 23/16* (2013.01)

(58) Field of Classification Search
CPC ........... F41G 11/003; F41C 23/16; F16B 2/10; F16B 2/18; F16M 13/022
USPC ..... 248/231.1, 231.31, 230.2, 228.2, 229.11, 248/222.14, 411–413; 42/90, 127, 148
See application file for complete search history.

(56) References Cited

U.S. PATENT DOCUMENTS

| 7,836,625 | B2  |   | 11/2010 | Swan et al. |           |
|-----------|-----|---|---------|-------------|-----------|
| D638,089  | S   | * | 5/2011  | Ding        | D22/109   |
| D672,839  | S   | * | 12/2012 | Ding        | D22/109   |
| 8,353,125 | B2  | * | 1/2013  | Riley       | F41G 11/003 |
|           |     |   |         |             | 248/315   |
| 8,806,796 | B1  | * | 8/2014  | Clifton     | F41G 11/003 |
|           |     |   |         |             | 42/127    |

(Continued)

*Primary Examiner* — Tan Le
(74) *Attorney, Agent, or Firm* — Kilpatrick Townsend & Stockton LLP

(57) ABSTRACT

Various clips for mounting accessories to rails, tracks and/or other mounts are described. In some examples, a clip may include a first part and a second part configured to at least partially cooperate with the first part to apply pressure to opposite sides of the rail, track or other mount. A tensioning mechanism may be configured to pull the first part and the second part together and/or to push the first part and the second part apart. A third part that may be configured to rotate with respect to the first part and/or the second part from an open position to a closed position, and to cooperate with the tensioning mechanism to pull the first part and the second part together and/or to push the first part and the second part apart. The third part may include a cam that is configured to increase a pressure applied by the first part and the second part to the rail, track or other mount when the third part is closed.

17 Claims, 12 Drawing Sheets

(56) References Cited

U.S. PATENT DOCUMENTS

| | | | | |
|---|---|---|---|---|
| 2010/0122485 A1* | 5/2010 | Kincel | ................. | F41G 11/004 42/146 |
| 2012/0167438 A1* | 7/2012 | Daniel | ................. | F41G 11/004 42/90 |
| 2016/0025120 A1* | 1/2016 | Swan | .................... | F41G 11/003 248/231.31 |

* cited by examiner

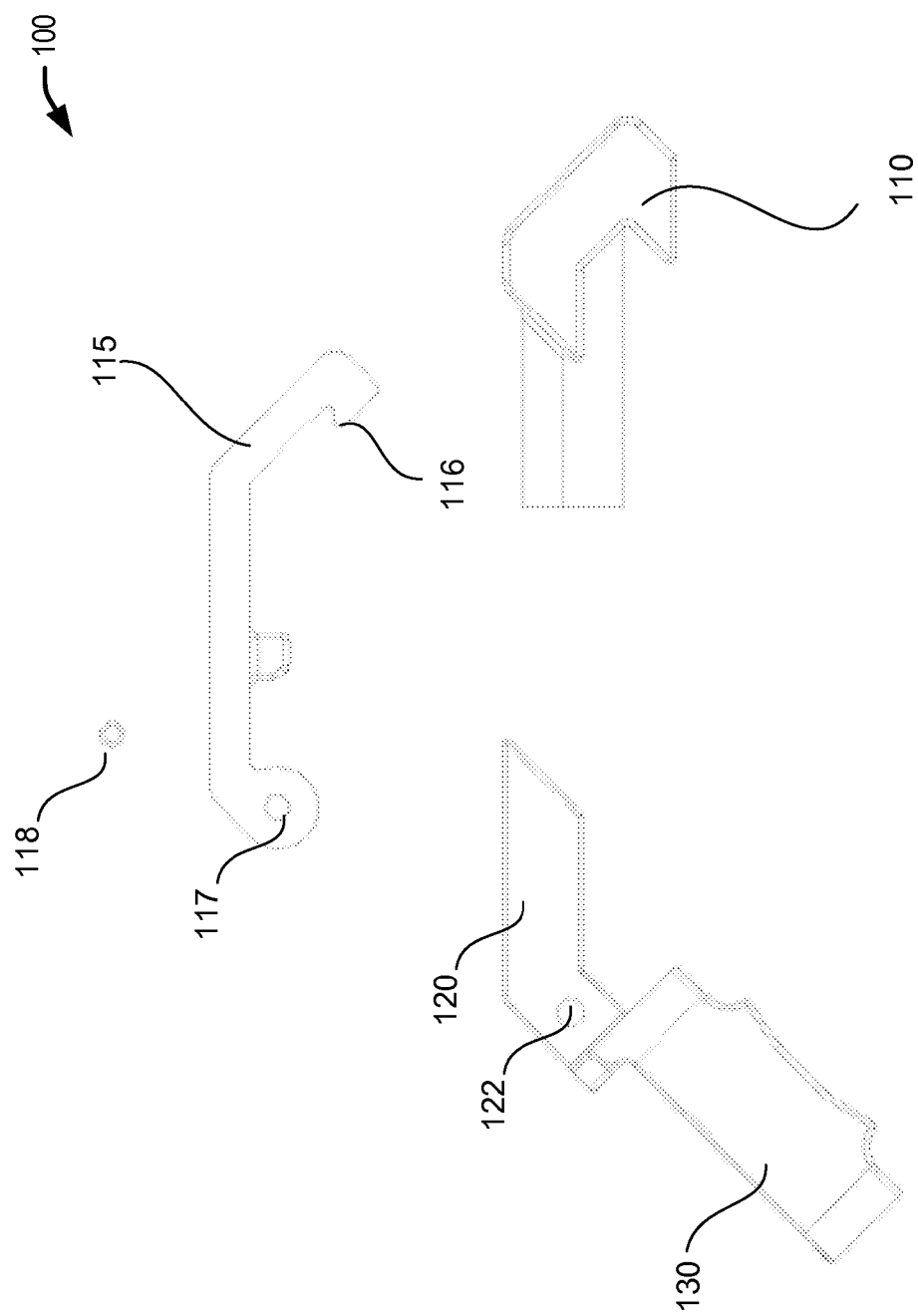

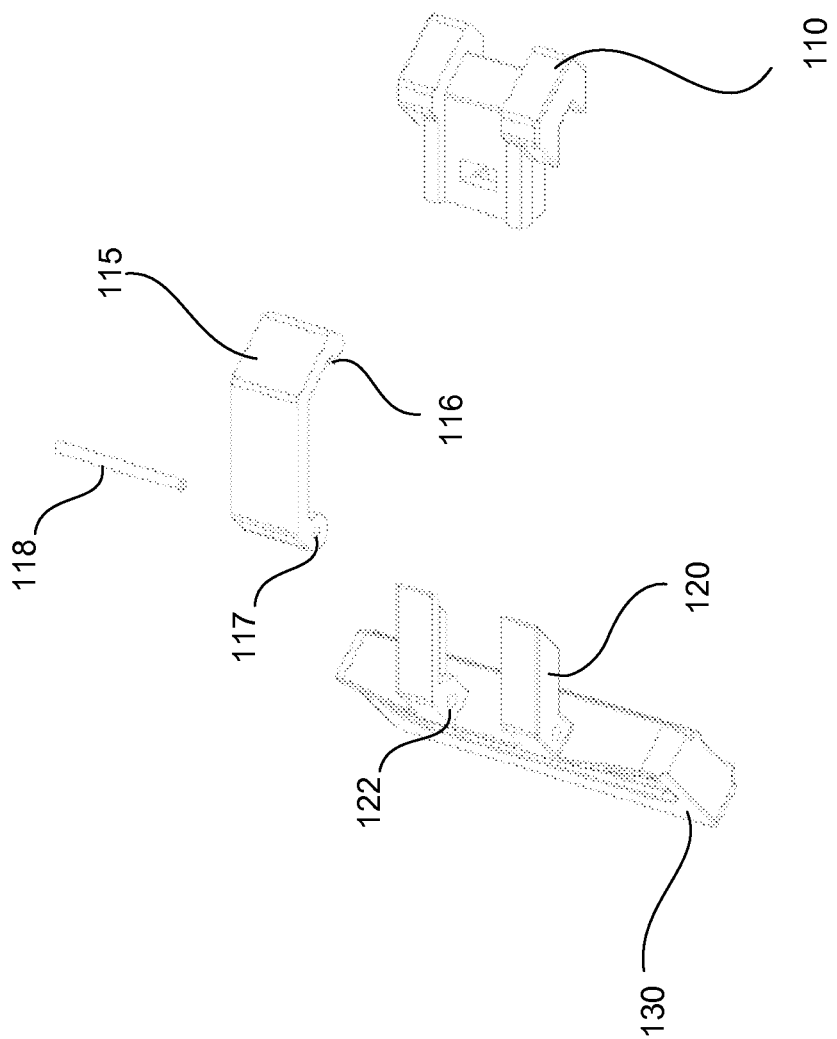

ACCESSORY CLIPS

RELATED APPLICATIONS

The present application claims priority under 35 U.S.C. §119(e) to U.S. Provisional Application No. 62/029,166 filed on Jul. 25, 2014, entitled "ACCESSORY CLIPS," the contents of which are hereby incorporated by reference herein in their entirety for all purposes.

BACKGROUND OF THE INVENTION

The present invention generally relates to attachment mechanisms, including clips and similar devices, for securing accessories to track or rail systems such as may be found on firearms, helmets, and other tactical and technical gear.

There is an ongoing need to provide attachment mechanisms for accessories that are secure and relatively quick to apply and remove. Many of the currently known devices require specialized tools and/or thread glue to secure an accessory holder to a rail or other mount. However, such methods are inconvenient for adjusting the accessories in the field and, when the device becomes loose, it may be impractical to re-secure without the proper tools or materials.

As discussed in U.S. Pat. No. 7,836,625, the contents of which are incorporated herein for all purposes, from the perspective of looking down the length of the rifle, a rail or rail system of a rifle has four mounting surfaces that are located at the 12, 3, 6, and 9 o'clock positions. The positions in between are simply unused space, herein referred to as "dead space." These dead spaces are closer to the center axis of the rifle barrel than the rail system mounting surfaces.

BRIEF SUMMARY OF THE INVENTION

According to first aspects of the invention, a device for connecting accessories to a rail, track or other mount, may include one or more of a first clamping part; a second clamping part configured to at least partially cooperate with the first clamping part to apply pressure to opposite sides of the rail, track or other mount; and/or a flexible part that is configured to rotate with respect to the first clamping part and to engage with the second clamping part and hold the first clamping part and the second clamping part in cooperative engagement.

In embodiments, the first clamping part and the second clamping part may be formed of a substantially rigid material, such as a metal, and the flexible part may be formed of a flexible material, such as a plastic.

In embodiments, the flexible part may be a substantially monolithic piece of molded, machined, cast, or 3-D patterned plastic or similar material.

In embodiments, the flexible part may include a ridge configured to cooperate with a corresponding ridge of the second clamping part and/or the rail, track or other mount.

In embodiments, the first clamping part may be attached to or may include an accessory, such as a flashlight or laser, or an accessory holder.

In embodiments, the first clamping part and the flexible part may be attached via an axial hinge.

In embodiments, the first clamping part, the second clamping part and the flexible part may be configured to form an assembly having a substantially flat outer surface and/or a substantially flat inner surface.

In embodiments, the substantially flat outer surface and/or inner surface may include at least a portion of the first clamping part, the second clamping part and the flexible part.

According to further aspects of the invention, a device for connecting accessories to a rail, track or other mount, may include one or more of a first clamping part; a second clamping part configured to at least partially cooperate with the first clamping part to apply pressure to opposite sides of the rail, track or other mount; a third clamping part that is configured to rotate with respect to the first clamping part and to engage with the second clamping part and hold the first clamping part and the second clamping part in cooperative engagement; and/or a compressible part disposed between at least a portion of the first clamping part and the second clamping part such that the first clamping part and the second clamping part compress the compressible part when brought into cooperative engagement by the clamping part.

According to further aspects of the invention, a device for connecting accessories to a rail, track or other mount, may include one or more of a first clamping part; a second clamping part configured to at least partially cooperate with the first clamping part to apply pressure to opposite sides of the rail, track or other mount; a tensioning mechanism configured to pull the first clamping part and the second clamping part together or push the first clamping part and the second clamping part apart; a third clamping part that is configured to rotate with respect to the second clamping part and to engage with an angled surface of the first clamping part as the first clamping part and second clamping part may be pulled together or pushed apart by the tensioning mechanism; and/or a first jaw including at least part of the second clamping part and at least a part of the third clamping part, and configured to hold an accessory in the first jaw.

In embodiments, at least one of the first clamping part or the third clamping part may include an angled surface that reduces a width of the first jaw as the first clamping part and second clamping part are pulled together or pushed apart by the tensioning mechanism.

In embodiments, the first jaw may be substantially c-shaped.

In embodiments, the tensioning mechanism may include a bolt passing at least partially through the first clamping part and the second clamping part.

In embodiments, the bolt passes through the first clamping part and may be in threaded engagement with the second clamping part.

In embodiments, a second jaw including at least part of the first clamping part and at least a part of the second clamping part, and configured to hold the device to a rail, track or other mount.

In embodiments, the second clamping part and the third clamping part may be attached via an axial hinge.

According to further aspects of the invention, a device for connecting accessories to a rail, track or other mount, may include one or more of a first part; a second part configured to at least partially cooperate with the first part to apply pressure to opposite sides of the rail, track or other mount; a tensioning mechanism configured to pull the first part and the second part together and/or push the first part and the second part apart; and/or a third part that is configured to rotate with respect to at least one of the first part or the second part from an open position to a closed position, and to cooperate with the tensioning mechanism to pull the first part and the second part together and/or push the first part and the second part apart.

In embodiments, the third part may include a cam that is configured to increase a pressure applied by the first part and the second part to the rail, track or other mount when the third part is closed.

In embodiments, the tensioning mechanism may include a bolt that may be rotationally attached to at least one of the first part or the third part via an axial hinge; and/or a nut that may be configured to move the bolt with respect to the second part by turning the nut.

In embodiments, at least one of the first part or the second part may include a recess configured to at least partially accommodate the nut. In some examples, the recess may be configured to hold the nut in a relatively fixed position in a length direction of the bolt.

In embodiments, second part may include an accessory (such as a light, a laser, a scope, etc.), or an accessory holder.

Embodiments may include at least one rod that engages with the first part and/or the second part as the first and second parts move together or apart.

In embodiments, the first and second parts may form a jaw configured to clamp on to the rail, track or other mount.

In embodiments, the first part includes a first engagement slot and/or rail configured to engage with one side of the rail, track or other mount and the second part includes a second engagement slot and/or rail configured to engage with the other side of the rail, track or other mount.

In embodiments, the first part and the second part are configured to move toward and away from each other in a generally coplanar manner. In some examples, this may be achieved by at least one rod that maintains the 2-dimensional orientation of the first part and the second part with respect to each other.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention claimed. The detailed description and the specific examples, however, indicate only preferred embodiments of the invention. Various changes and modifications within the spirit and scope of the invention will become apparent to those skilled in the art from this detailed description.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the related technology. No attempt is made to show structural details of technology in more detail than may be necessary for a fundamental understanding of the invention and various ways in which it may be practiced. In the drawings:

FIGS. 1-4 depict a first exemplary embodiments of the present subject matter.

DETAILED DESCRIPTION OF THE INVENTION

Figure 1:
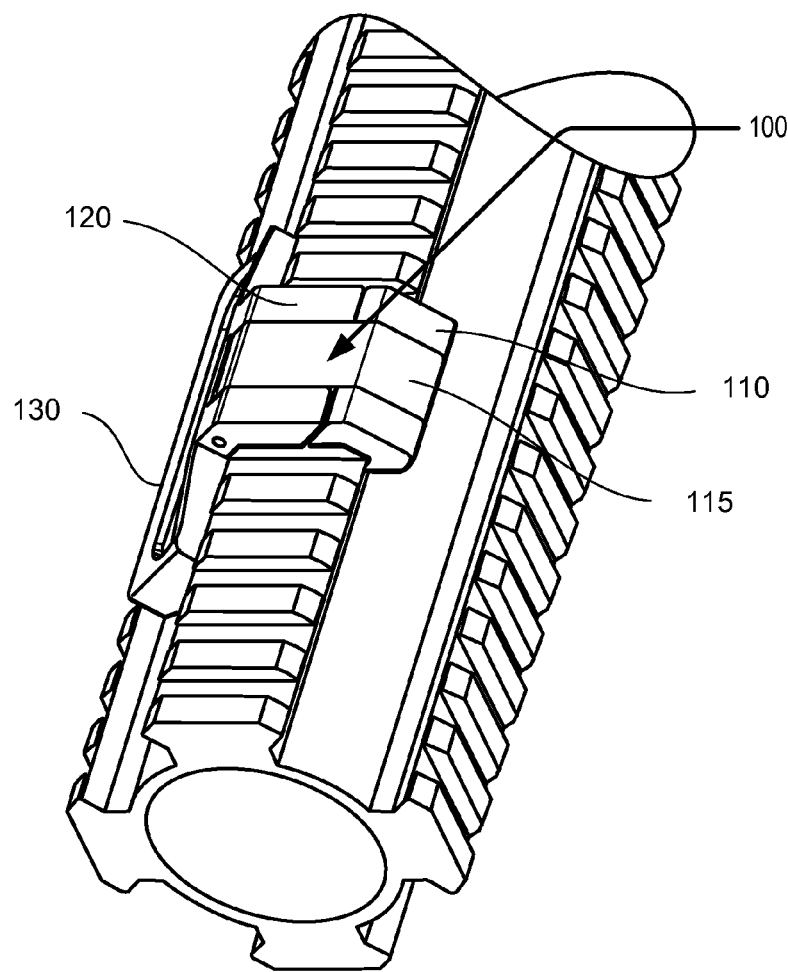
Figure 2:
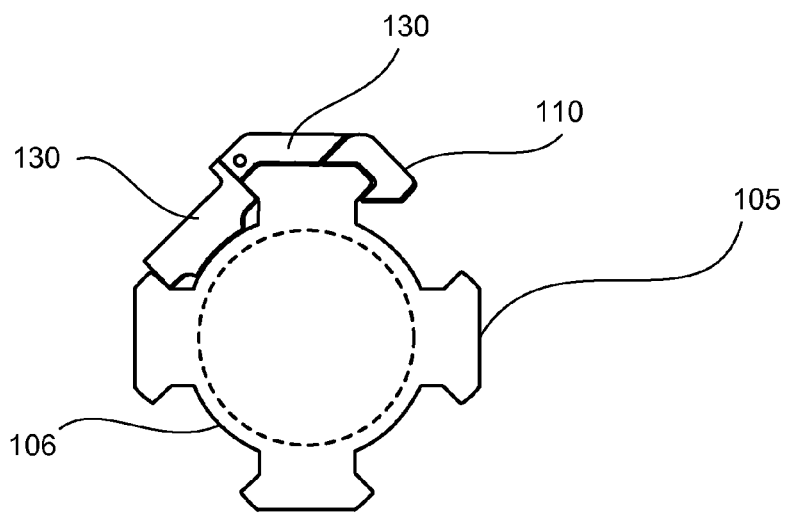

It is understood that the invention is not limited to the particular methodology, protocols, etc., described herein, as these may vary as the skilled artisan will recognize. It is also to be understood that the terminology used herein is used for the purpose of describing particular embodiments only, and is not intended to limit the scope of the invention. It also is to be noted that as used herein and in the appended claims, the singular forms "a," "an," and "the" include the plural reference unless the context clearly dictates otherwise. Thus, for example, a reference to "a support member" is a reference to one or more support members and equivalents thereof known to those skilled in the art.

Unless defined otherwise, all technical terms used herein have the same meanings as commonly understood by one of ordinary skill in the art to which the invention pertains. The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law.

FIGS. 1-4 show an embodiment of a mounting member or low profile mount. The exemplary current rail system's official title MIL-STD-1913 is a bracket used on most combat assault rifles in order to provide a standardized mounting platform for iron sights, telescopic sights, tactical lights, overt and IR laser systems, vertical grips, bipods, sling attachment points and/or other accessories. The standard was published by the Picatinny Arsenal and is also known to those skilled in the art as the Picatinny Rail, herein referred to as the rail or "rail system." The present subject matter is applicable to other rail, track and mounts that can be clamped (from the inside or outside of the mount).

Embodiments provide a platform herein referred to as connecting device, a mounting member or "low profile mount" that may be advantageously used to accept one or multiple optional accessories to the dead space (or other position) of the rail system at desired locations and with positional security. The mounting member or low profile mount may have slides, threaded holes, and/or other mounting fixtures suited to securing the accessories to the dead space. The low profile mount may be configured to present a relatively low-profile protrusion from the rail system using physical surfaces that offer low risk of snagging or being caught in external devices when accessories are not in place. Embodiments allow for adjustment of the position of the accessories when they are attached to the low profile mount, which desirably optionally accepts more than one optional accessory thereon.

As shown in FIGS. 1-4, a clamping device 100 may be attached to a rail 105. The device 100 may include a first part 120, a second part 110, and a third part 115. In some examples the third part 115 may be flexible in order to allow it to act as a flexible clamp, securing first part 120 and second part 110 together by locking ridge 116 with a corresponding ridge of the second part 110 and/or rail 105.

An accessory holder 130 may be attached to, or formed with, the first part 120, and may be configured to fit within a dead space between rails 105. First part 120, second part 110, and third part 115 may be configured such that, when assembled, they form an assembly with a substantially smooth outer surface (top of FIG. 2), and/or a substantially smooth inner surface (in contact with the rail 105). These surfaces may include portions of two or more of first part 120, second part 110, and third part 115, e.g. as shown in FIG. 1. In some examples, the third part 115 may be rigid and a compressible part (not shown) may be disposed between the first part 120 and the second part 110 such that the first and second parts compress the compressible part as they are drawn together. Some examples may include an axial hinge 118 that goes through hole 117 in the third part 115 and hole 122 in the first part 120.

In some embodiments, the parts 110, 120 and/or 115 may be constructed from a rigid or generally solid material such as, for example, a metal such as aluminum and/or steel. However, the parts 110, 120 and/or 115 may be constructed from any other material known to those skilled in the art on which an accessory is capable of mounting with sufficient stability. The parts 110, 120 and/or 115 may be machined out of solid stock material or may be made by any other method known to those skilled in the art for constructing a generally solid mounting device on which one or more accessories are capable of mounting. Any dimensions for the parts 110, 120, 115 and/or 130 which facilitate mounting of one or more accessories thereon are contemplated by the inventors of the present invention. Although not intended to be limiting of embodiments, in one embodiment, the length of the part 130 may be approximately 3.5 inches, the width of the assembly including parts 110, 120 and/or 115 may be approximately 1.0 inch, and the height of the assembly (over the rail 105) including parts 110, 120 and/or 115 may be approximately 0.25 inches.

Figure 5:
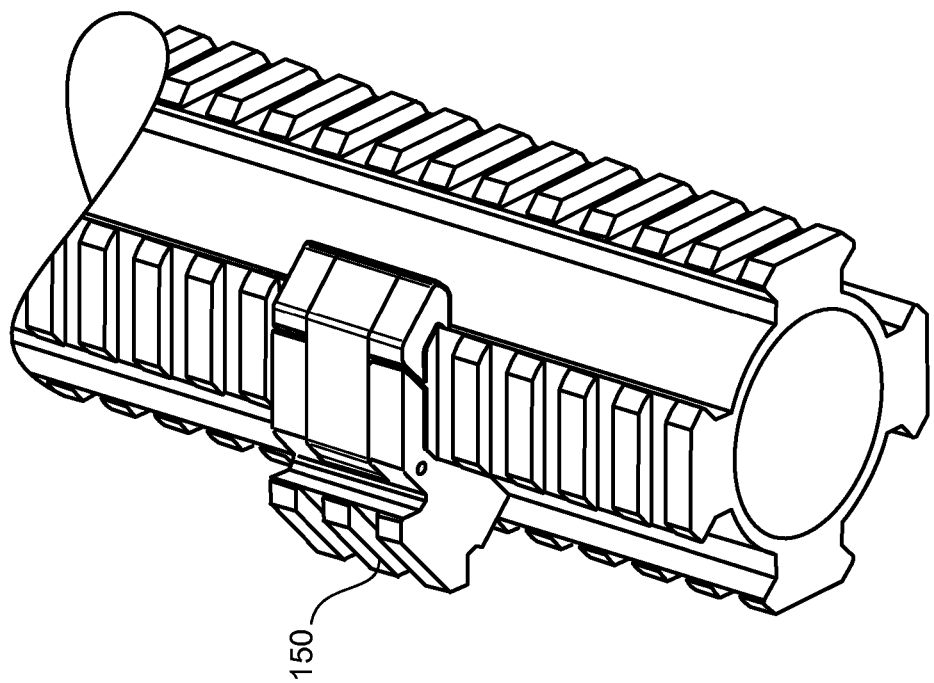
Figure 7:
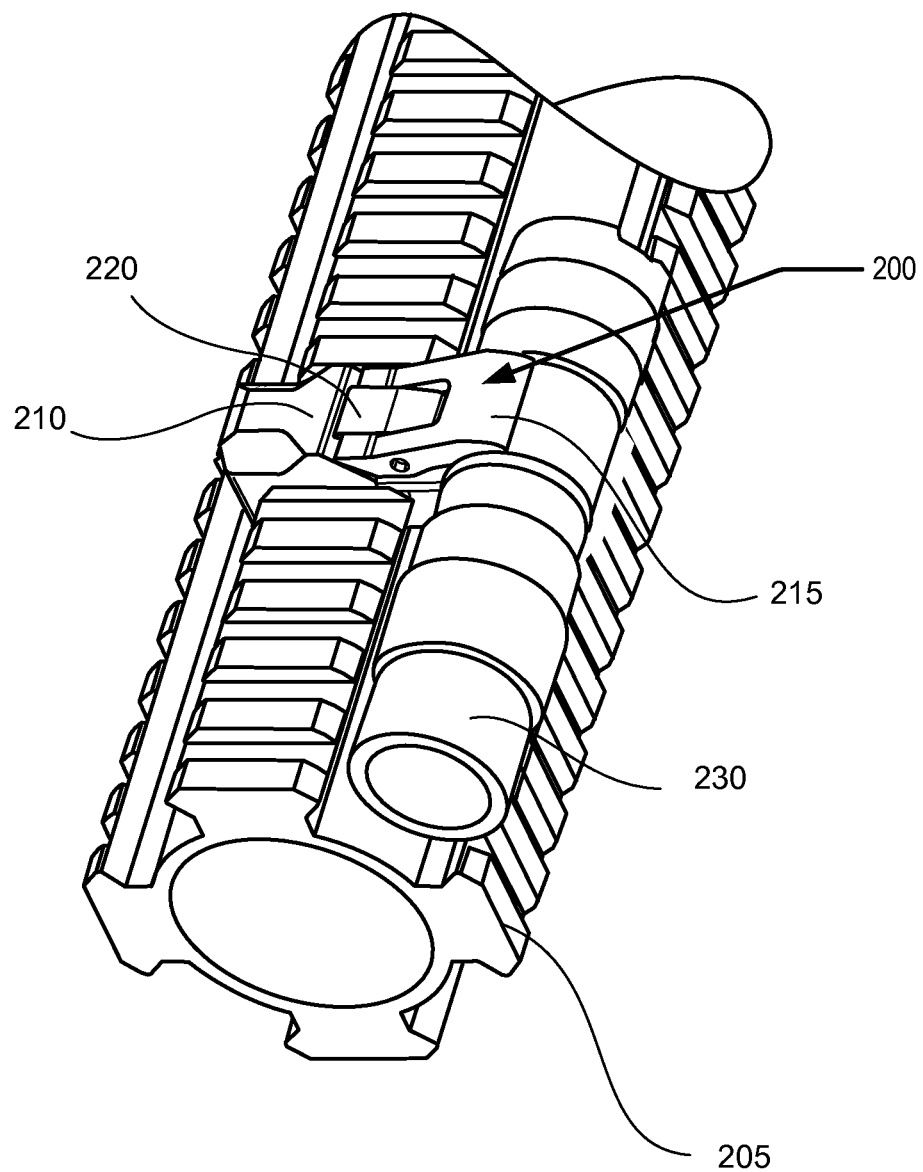
FIGS. 7-10 depict another exemplary embodiment of the present subject matter.
Figure 8:
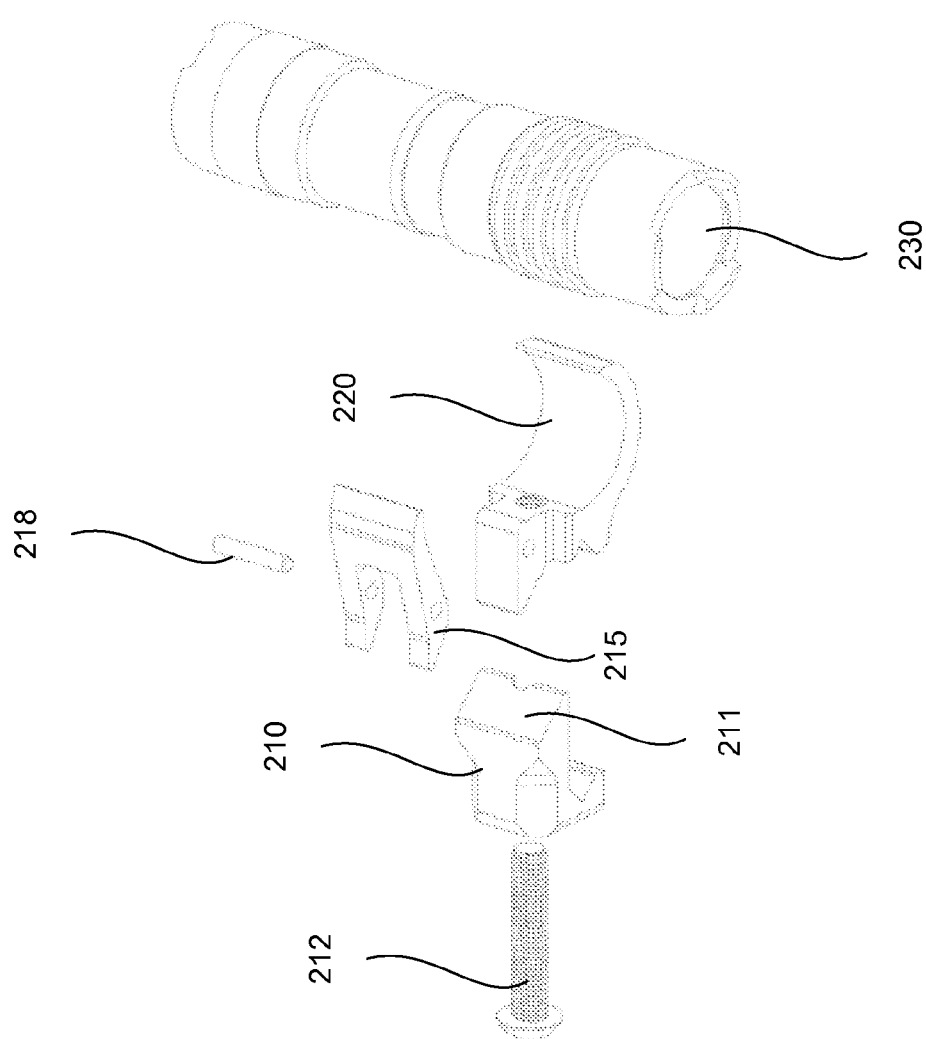
Figure 9:
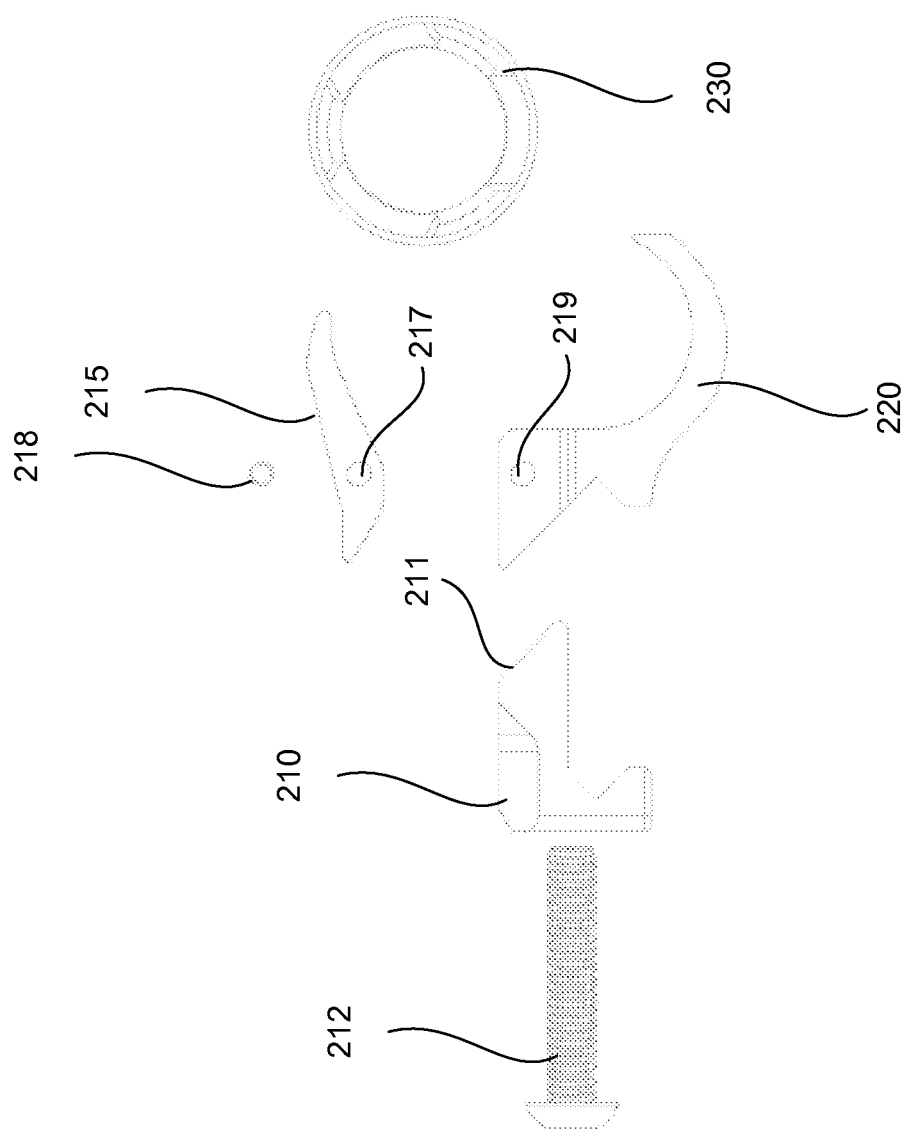

In FIG. 5, another rail segment 150 is shown mounted to the device 100 (rather than the accessory holder 130), the device 100 being operatively attached to the rail 105. The additional rail segment 150 may be used to mount any type of accessory in an offset position from the device 100. Exemplary accessories which may be mounted to the additional rail section 150 include flashlights, one or more bipods, one or more variations of a grip system, one or more laser modules, one or more switches for actuate lasers and/or lights, and/or any other accessories which are desired to be mounted to a firearm.

Figure 6:
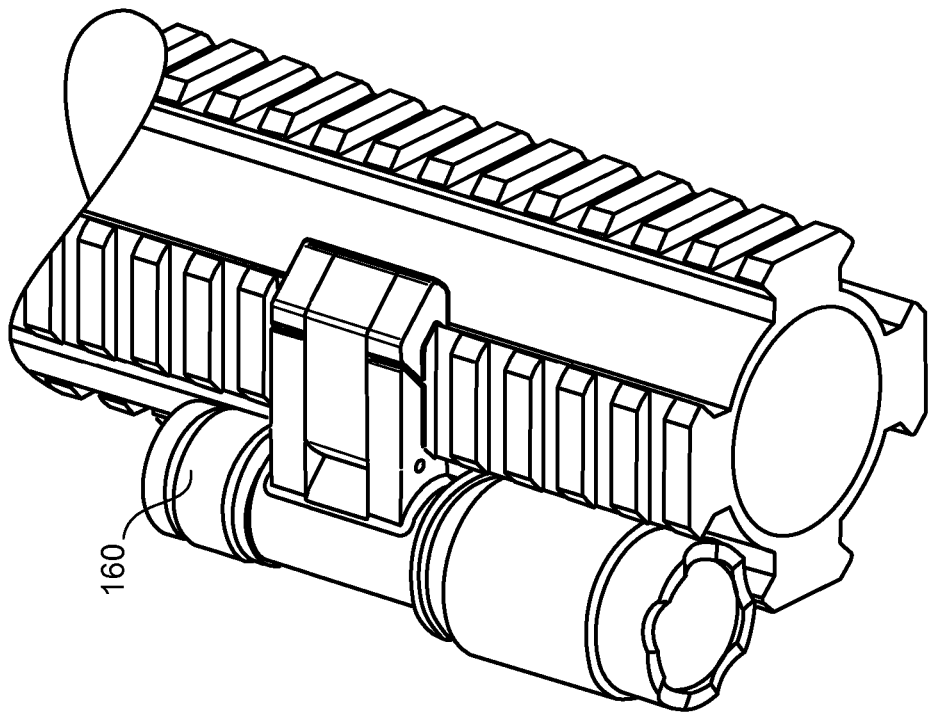
FIGS. 5 & 6 depict various other exemplary embodiments of the present subject matter related to the device shown in FIGS. 1-4.

In FIG. 6, a flashlight 160 is shown mounted to the device 100 (rather than the accessory holder 130), the device 100 being operatively attached to the rail 105. The flashlight 160 represents any type of accessory for mounting on the device 100. Exemplary accessories which may be utilized in lieu of one or more flashlights are one or more bipods, one or more variations of a grip system, one or more laser modules, one or more switches for actuate lasers and/or lights, and/or any other accessories which are desired to be mounted to a firearm or other tactical or technical gear.

FIGS. 7-10 show another exemplary embodiment of a clamping device 200 that may be attached to a rail 205 or other mount. The device 200 may include a first part 210, a second part 220, and a third part 215. In some examples the second part 220 and the third part 215 may form a "jaw" between them that is configured to hold an accessory, such as a flashlight 230, a laser, etc.

The second part 220 may be configured to at least partially cooperate with the first clamping part 210 to apply pressure to opposite sides of the rail 205, track or other mount. The third part 215 may be configured to rotate with respect to the second part 220, e.g. via axial hinge 218 in holes 217, 219. A tensioning mechanism including bolt 212 is configured to pull the first part 210 and the second part 220 together and/or to push the first part and the second part apart.

Third part 215 is configured to rotate with respect to the second part 210 and to engage with an angled surface 211 of the first part as the first part and the second part are pulled together or pushed apart by the tensioning mechanism.

Part of the second part 220 and part of the third part 215 form a clamping jaw, and are configured to hold an accessory therein.

Figure 10:
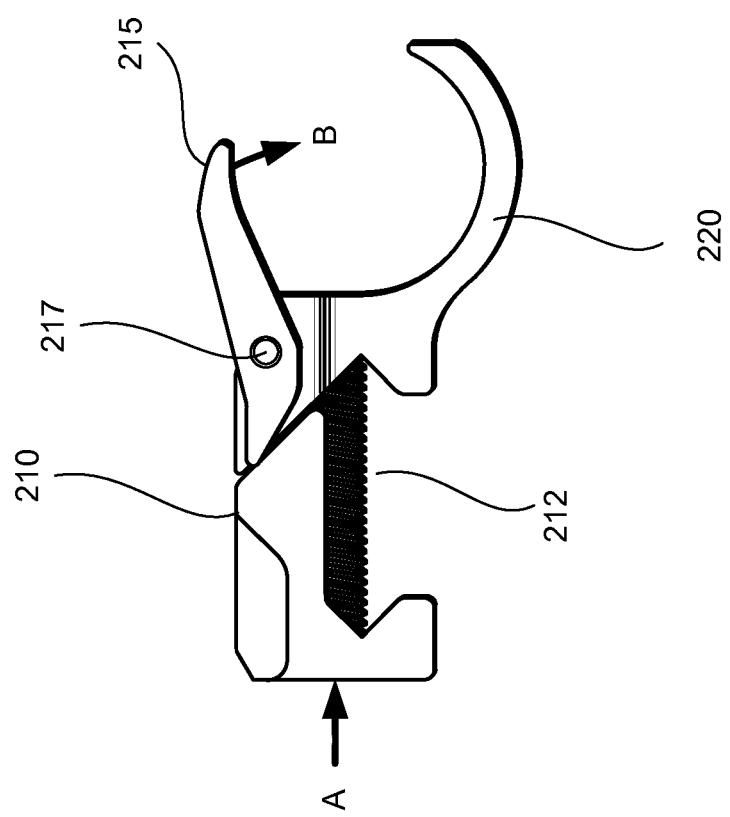
Figure 11:
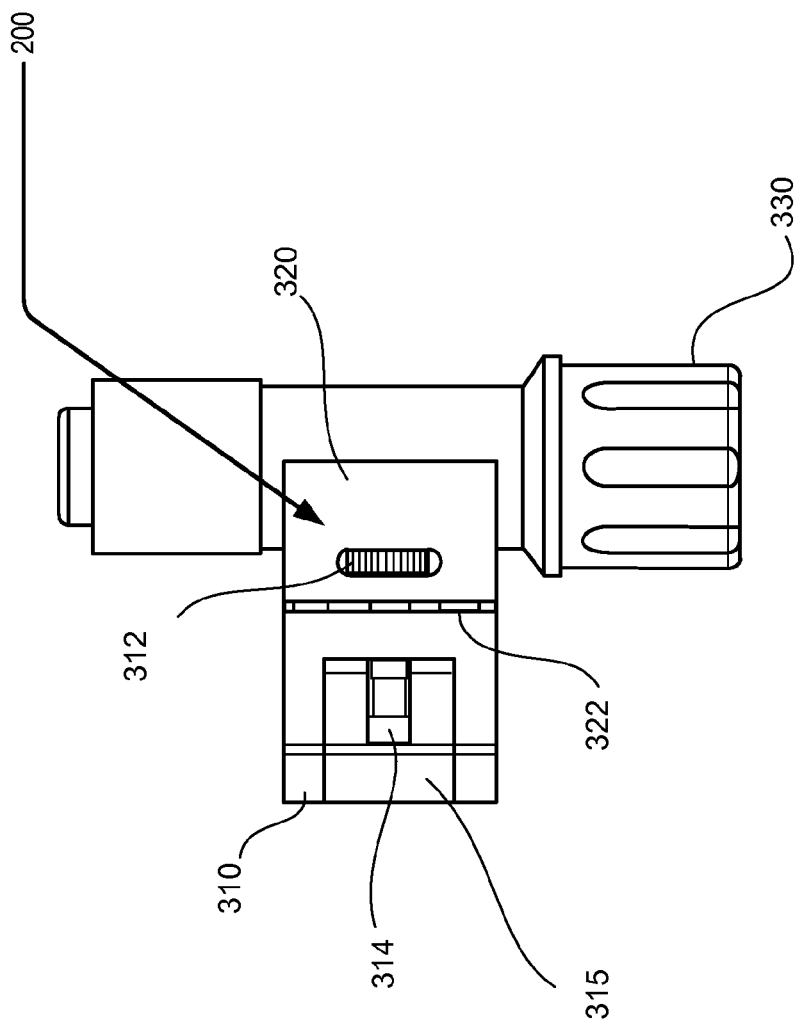
FIGS. 11-14 depict another exemplary embodiment of the present subject matter.

As shown in FIG. 10, the angled surface 211 of the first part 210 and the angled surface 216 of the third part 215 are configured to reduce a width of the jaw by moving the third part 215 in the direction of the B arrow, as the first part and second part are pulled together by moving the first part 210 in the direction of the A arrow. As also shown in FIG. 10, the jaw may be substantially c-shaped.

The bolt 212 passes through the first part 210 and mates in threaded engagement with the second part 220. In some examples, the device 200 may be configured such that bolt 212 fits in gaps between individual rail sections 205. Flashlight 230 or other accessory may be configured to fit within a dead space between rails 205.

In some embodiments, the parts 210, 220 and/or 215 may be constructed from a rigid or generally solid material such as, for example, a metal such as aluminum and/or steel. However, the parts 210, 220 and/or 215 may be constructed from any other material known to those skilled in the art on which an accessory is capable of mounting with sufficient stability. The parts 210, 220 and/or 215 may be machined out of solid stock material or may be made by any other method known to those skilled in the art for constructing a generally solid mounting device on which one or more accessories are capable of mounting. Any dimensions for the parts 210, 220, 215 which facilitate mounting of one or more accessories thereon are contemplated by the inventors of the present invention. Although not intended to be limiting of embodiments, in one embodiment, the width of the assembly including parts 210, 220 and/or 215 may be approximately 1.0 inch, and the height of the assembly (over the rail 205) including parts 210, 220 and/or 215 may be approximately 0.25-0.5 inches.

FIGS. 11-14 show another exemplary embodiment of a clamping device 300 that may be attached to a rail 305 or other mount. The device 300 may include a first part 310, a second part 320, and a third part 315. In some examples the second part 320 may include an accessory, such as a flashlight 330, a laser, etc., or may include an accessory holder, such as those previously described. Flashlight 330 or other accessory may be configured to fit within a dead space between rails 305.

First part 310 and second part 320 may be configured to at least partially cooperate to apply pressure to opposite sides of the rail 305, or to a track or other mount. A tensioning mechanism including, for example, a bolt 314 and a nut 312 may be configured to pull the first part 310 and the second part 320 together and/or push the first part and/the second part apart. In the example shown in FIG. 12, the nut 312 is partially accommodated in a recess of the second part 320, which holds the nut 312 in a relatively fixed position in a length direction of the bolt 314. Therefore, the nut 312 applies pressure to the wall of the recess as the third part 315 is closed, and (when the device is in the open position) the nut 312 can be turned to adjust the effective length of the bolt 314 (i.e. the length of the bolt 314 from the nut 312 to the engagement point with the third part 315), so that the appropriate amount of compression or expansion can be obtained by closing the third part 315.

The third part 315 is configured to rotate with respect to the first part 310 from an open position (e.g. 10-110 degrees above horizontal in FIG. 13) to a closed position (e.g. substantially flush with the first part 310), and to cooperate with the tensioning mechanism (e.g. via hinge 318 through holes 319, 317) to pull the first part 310 and the second part 320 together and/or push the first part and the second part apart.

Figure 12:
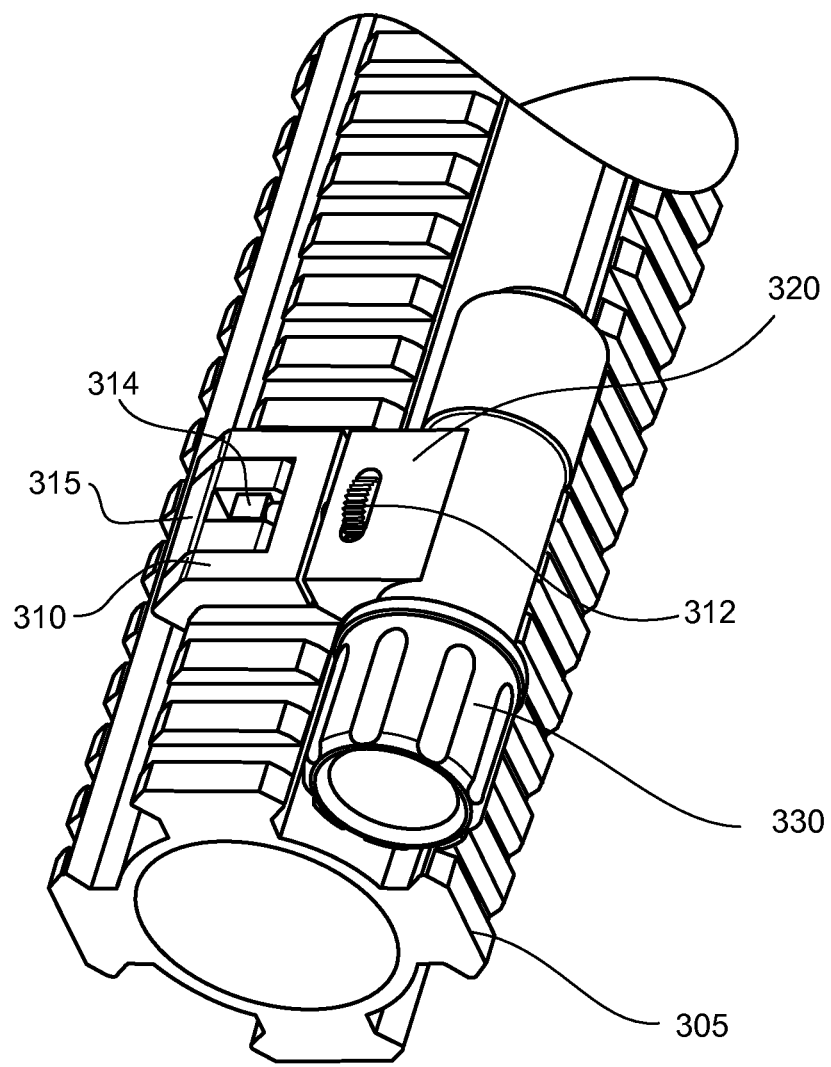
Figure 14:
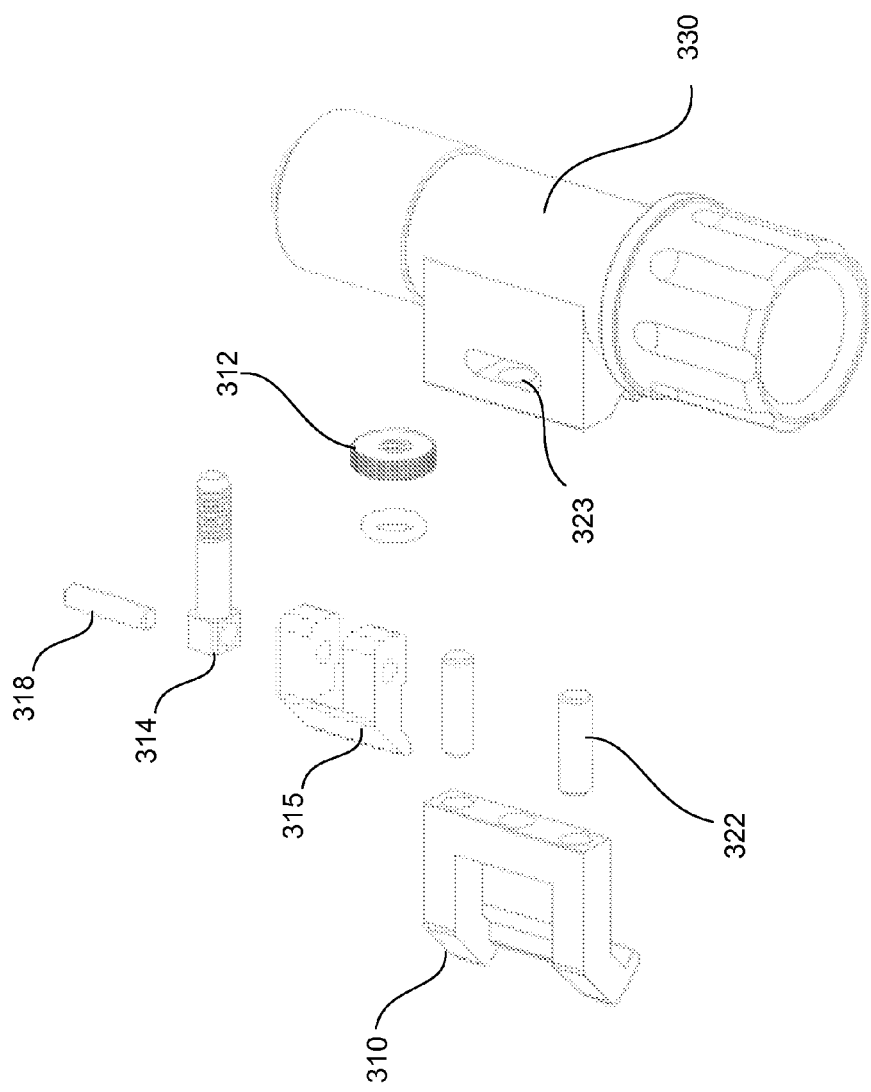

The third part 315 may include a cam (e.g. based on the different thicknesses around hole 319) that is configured to increase a pressure applied by the first part 310 and the second part 320 to the rail 305, track or other mount when the third part 315 is closed. As shown in FIG. 14, the first part includes a recess configured to at least partially accommodate the third part 315 when the third part is in a closed position (as shown in FIG. 12), and the recess includes a surface upon which the cam engages. For example, the cam of third part 315 acts against a wall of the recess in first part 310. In other examples, a wall of the recess in the first part 310 may be shaped to act as and/or assist the cam, e.g. by angling or curving the wall of the recess. As mentioned above, the cam (or other tensioning mechanism) may also be configured to force the first part and the second part apart from each other, e.g. in cases where the device fits within a track and expansion provides the holding force.

Figure 13:
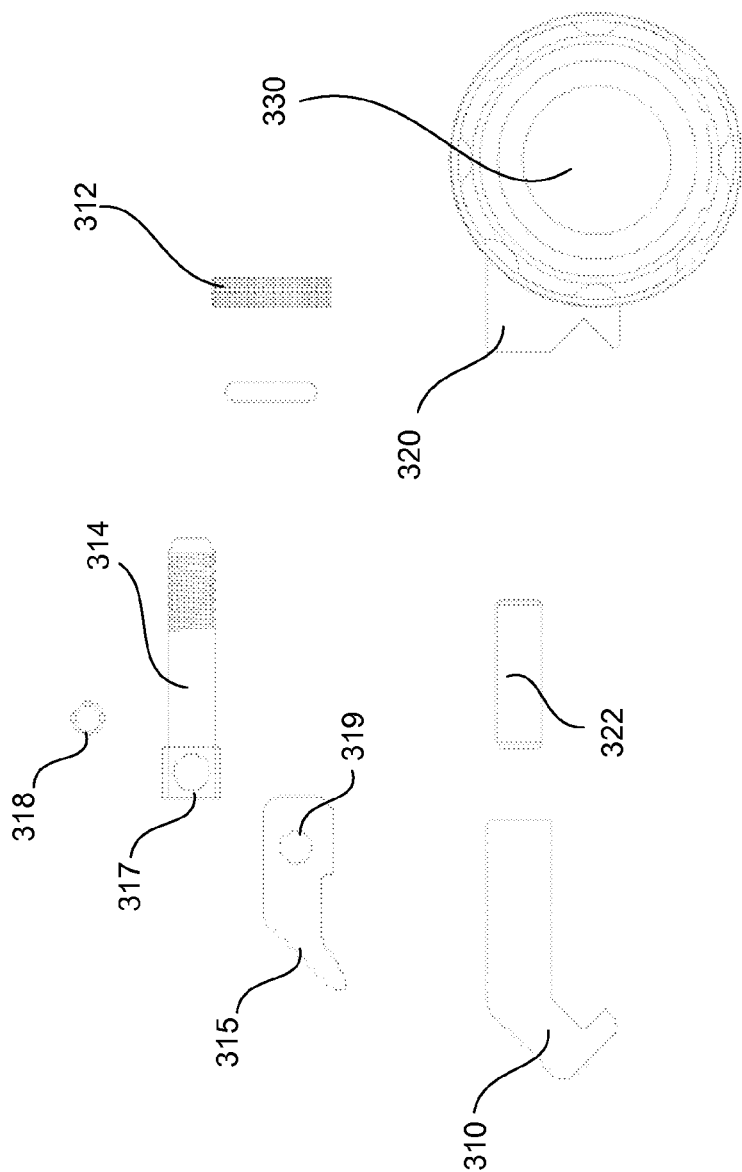

As also shown in FIGS. 13 and 14, bolt 314 may be rotationally attached to the third part 315 via an axial hinge, and nut 312 (held by second part 320) is configured to move the bolt with respect to the second part 320 by turning the nut 312. However, in some other embodiments, the bolt 314 may be rotationally attached to the first part 310 or the second part 320 via an axial hinge.

Rods 322 may also engage with the first part 310 and/or the second part 320 as the first and second parts move together or apart. Rods 322 may be fixedly attached to one of the first part 310 or the second part 320, with the other of the first or second part sliding along the rod 322, or the first part 310 and the second part 320 may each slide relative to the rods 322. Although shown as substantially cylindrical rods, it should be appreciated that the rods 322 may be formed as connecting members in various ways and shapes. For example, variously rounded, rectangular, or angled rods may be used with correspondingly shaped receiving tracks.

In the example shown in FIGS. 11-14, the first part 310 and the second part 320 are configured to move toward and away from each other in a generally coplanar manner. This may be achieved, for example, by at least one of rods 322 that maintain the 2-dimensional orientation of the first part 310 and the second part 320 with respect to each other.

As can be seen, for example, in FIG. 13, the first part 310 includes a first engagement slot and rail on the lower inner surface that is configured to engage with one side of the rail 305 and the second part 320 includes a second engagement slot and rail on the lower inner surface that is configured to engage with the other side of the rail 305.

In some embodiments, the parts 310, 320 and/or 315 may be constructed from a rigid or generally solid material such as, for example, a metal such as aluminum and/or steel. However, the parts 310, 320 and/or 315 may be constructed from any other material known to those skilled in the art on which an accessory is capable of mounting with sufficient stability. The parts 310, 320 and/or 315 may be machined out of solid stock material or may be made by any other method known to those skilled in the art for constructing a generally solid mounting device on which one or more accessories are capable of mounting. Any dimensions for the parts 310, 320, 315 which facilitate mounting of one or more accessories thereon are contemplated by the inventors of the present invention. Although not intended to be limiting of embodiments, in one embodiment, the width of the assembly including parts 310, 320 and/or 315 may be approximately 1.0 inch, and the height of the assembly (over the rail 305) including parts 310, 320 and/or 315 may be approximately 0.25-0.5 inches.

While various embodiments have been described above, it is to be understood that the examples and embodiments described above are for illustrative purposes only and that various modifications or changes in light thereof will be suggested to persons skilled in the art, and are to be included within the spirit and purview of this application and scope of the appended claims. Therefore, the above description should not be understood as limiting the scope of the invention as defined by the claims.

What is claimed is:

1. A device for connecting accessories to at least one of a rail, track or mount extending in a first direction, comprising:
    a first part;
    a second part configured to at least partially cooperate with the first part to apply pressure to opposite sides of the at least one of rail, track or mount;
    a tensioning mechanism configured to pull the first part and the second part together;
    a third part that is configured to rotate with respect to the first part from an open position to a closed position, and to cooperate with the tensioning mechanism to pull the first part and the second part together; and
    at least one connecting part that engages in a sliding manner with at least one of the first part or the second part as the first and second parts move together,
    wherein at least one of the third part and the first part includes a cam that is configured to increase a pressure applied by the first part and the second part to the at least one of rail, track or mount as the third part is closed,
    wherein the tensioning mechanism includes a bolt that is rotationally attached to at least one of the first part or the third part via an axial hinge extending in the first direction, and a nut that is configured to adjust an effective length of the bolt with respect to the second part by turning the nut, and
    wherein the at least one connecting part is next to the bolt and maintains the first part and the second part in substantially coplanar alignment as the first part and the second part move relative to one another.

2. The device of claim 1, wherein the second part includes at least one of an accessory or an accessory holder.

3. The device of claim 1, wherein the first and second parts form a jaw that is configured to clamp on to the at least one rail, track or mount.

4. The device of claim 1, wherein the at least one connecting part including a pair of rods disposed on opposite sides of the bolt.

5. The device of claim 1, wherein the at least one connecting part is received by holes in the first part and the second part.

6. The device of claim 1, wherein the first part includes a recess configured to at least partially accommodate the third part when the third part is in a closed position, and the recess includes a surface upon which the cam engages.

7. A device for connecting accessories to at least one of a rail, track or mount extending in a first direction, comprising:
- a first part;
- a second part configured to at least partially cooperate with the first part to apply pressure to opposite sides of the at least one rail, track or mount;
- a tensioning mechanism configured to at least one of pull the first part and the second part apart together, or push the first part and the second part apart;
- a third part that is configured to rotate with respect to the first part from an open position to a closed position, and to cooperate with the tensioning mechanism to at least one of pull the first part and the second part together, or push the first part and the second part apart;
- at least one connecting part that engages in a sliding manner with at least one of the first part or the second part as the first and second parts move together, and
- a cam configured to increase a pressure applied by the first part and the second part to the at least one of rail, track or mount when the third part is closed,
- wherein the tensioning mechanism includes a bolt that is rotationally attached to at least one of the first part or the third part via an axial hinge extending in the first direction, and
- wherein the at least one connecting part is next to the bolt and maintains the first part and the second part in substantially coplanar alignment as the first part and the second part move relative to one another.

8. The device of claim 7, wherein the tensioning mechanism includes:
- a nut that is configured to adjust an effective length of the bolt with respect to the second part by turning the nut.

9. The device of claim 7, wherein the second part includes at least one of an accessory or an accessory holder.

10. The device of claim 7, wherein the first and second parts form a jaw that is configured to clamp on to the at least one rail, track or mount.

11. The device of claim 7, wherein the first part includes a recess configured to at least partially accommodate the third part when the third part is in a closed position, and the recess includes a surface upon which the cam engages.

12. The device of claim 1, wherein the device has a total width, along the rail, track or mount, of approximately 1.0 inches.

13. The device of claim 1, wherein the device has a total height of approximately 0.25-0.5 inches over the rail, track or mount.

14. The device of claim 1, wherein the cam and the axial hinge are disposed in a position that covers the rail, track or mount.

15. The device of claim 7, wherein the at least one connecting part including a pair of rods disposed on opposite sides of the bolt.

16. The device of claim 7, wherein the at least one connecting part is received by holes in the first part and the second part.

17. The device of claim 7, wherein the cam and the axial hinge are disposed in a position that covers the rail, track or mount.

* * * * *